United States Patent
Sisto

(10) Patent No.: US 8,950,600 B2
(45) Date of Patent: Feb. 10, 2015

(54) METHOD AND SYSTEM FOR SECURING A CROSS MEMBER TO A TUBE

(76) Inventor: Salvatore J. Sisto, Bradley Beach, NJ (US)

( * ) Notice: Subject to any disclaimer, the term of this patent is extended or adjusted under 35 U.S.C. 154(b) by 361 days.

(21) Appl. No.: 13/150,397

(22) Filed: Jun. 1, 2011

(65) Prior Publication Data

US 2012/0305537 A1 Dec. 6, 2012

(51) Int. Cl.
*F16B 9/02* (2006.01)
*F16B 7/04* (2006.01)

(52) U.S. Cl.
CPC ............... *F16B 7/0493* (2013.01); *F16B 9/026* (2013.01)
USPC .......................... 211/105.1; 403/188; 403/240

(58) Field of Classification Search
CPC ........ A47K 10/04; A47K 10/10; F16B 12/04; F16B 12/06; F16B 12/08
USPC ......... 403/187, 188, 240, 270, 271, 345, 346, 403/347, 361, 362, 382, 403; 211/105.1, 211/123; 256/65.09, 65.11, 65.12
See application file for complete search history.

(56) References Cited

U.S. PATENT DOCUMENTS

| | | | | |
|---|---|---|---|---|
| 823,451 A | * | 6/1906 | Sweeney et al. | 403/274 |
| 1,992,710 A | * | 2/1935 | Matthael | 403/271 |
| 2,113,403 A | * | 4/1938 | Harmon | 403/246 |
| 2,150,651 A | * | 3/1939 | Ewing | 403/272 |
| 2,614,827 A | * | 10/1952 | Peach et al. | 403/167 |
| 2,815,972 A | * | 12/1957 | Lagervall | 403/260 |
| 4,238,117 A | * | 12/1980 | Newman | 403/271 |
| 4,595,311 A | * | 6/1986 | Salama et al. | 403/271 |
| 4,643,607 A | * | 2/1987 | Caudill et al. | 403/246 |
| 4,679,261 A | * | 7/1987 | Stanley et al. | 403/362 |
| 4,912,809 A | * | 4/1990 | Scheuer | 403/362 |
| 5,275,236 A | * | 1/1994 | Le Gauyer | 165/178 |
| 5,441,241 A | * | 8/1995 | McKim | 403/270 |
| 6,796,442 B1 | * | 9/2004 | Wu | 211/105.1 |
| 7,490,803 B1 | * | 2/2009 | Graves | 403/283 |
| 7,654,571 B2 | * | 2/2010 | Gabbianelli et al. | 280/781 |
| 2009/0205124 A1 | * | 8/2009 | Forrest et al. | 4/576.1 |

FOREIGN PATENT DOCUMENTS

DE 42 28 033 * 3/1994 ............. F16B 12/50

* cited by examiner

*Primary Examiner* — Michael P Ferguson

(74) *Attorney, Agent, or Firm* — Gottlieb, Rackman & Reisman, PC

(57) ABSTRACT

There is provided in a preferred embodiment a method and system for attaching a cross member to a tube. The tube has two holes drilled into it at opposite surfaces. The upper body of the cross member is inserted into one hole, through the tube and into the opposite hole. At the opposite hole, the cross member is welded or otherwise affixed to the tube. The lower body of the cross member is designed and adapted to be selectively attached to the upper body.

13 Claims, 6 Drawing Sheets

METHOD AND SYSTEM FOR SECURING A CROSS MEMBER TO A TUBE

FIELD OF THE INVENTION

This invention relates generally to a method and system for securing a cross member to a tube, bar or channel. The invention involves a stronger and more secure connection between the tube and the cross member. More specifically, this invention involves inserting the cross member through the diameter of a tube and securing the cross member to the opposite end from which it is inserted of the tube to create a stronger and more secure attachment.

BACKGROUND OF THE INVENTION

When securing a tube to a cross member, the strength and durability of the attachment may be important. Depending on the specific dimensions of the tube and the cross member, and depending on the amount of force that will be applied to the attachment, the attachment may fail if it is not strong enough.

Existing attachment techniques include welding or fastening the cross member to the exterior of the tube/bar/channel. When fastening, a hole is drilled in the exterior of the tube and a fastener is inserted through the exterior of the tube and is secured to a bolt on the inside of the tube. Both the welding technique and fastener technique provide load and tension strength, but both are weak against lateral or sheer forces, rotational forces and moment forces.

SUMMARY OF THE INVENTION

In view of the deficiencies and drawbacks in the prior art, it is a primary object of the present invention to provide a method and system for securing a cross member to a tube that provides increased attachment strength, especially against lateral, sheer, rotational forces and moment forces.

Another object of the present invention is to provide a method and system for securing a cross member to a tube, so that the point of attachment does not deform when force is applied to it.

A further object of the present invention is to provide a method and system for securing a cross member to a tube that is aesthetically pleasing and provides a clean look and feel.

An additional object of the present invention is to provide a method and system for securing a support to a tube that is simple to install and replace.

In summary, provided in a preferred embodiment of the present invention is a method and system for securing a cross member to a tube. Two holes are drilled into the tube and the cross member is inserted through one hole, through the center of the tube and into the second opposite hole. The cross member includes a head, an upper body and a lower body. The head and the upper body are inserted into the second opposite hole, where the head is welded or otherwise attached to the tube. Preferably, the lower body is detached from the upper body during attachment to the tube.

Once the upper body is attached to the tube, the lower body can easily be attached to the upper body to complete the cross member. The upper body includes a central projection and the lower body includes a receiving cavity, sized and shaped to receive the projection. The lower body further includes a screw hole and a screw. The screw is inserted through the screw hole and, when engaged, creates an interference fit between the screw, the central projection and an inner wall of the receiving cavity.

BRIEF DESCRIPTION OF THE DRAWINGS

The above-described and other advantages and features of the present disclosure will be appreciated and understood by those skilled in the art from the following detailed description and drawings of which.

DETAILED DESCRIPTION OF THE INVENTION

Figure 1:
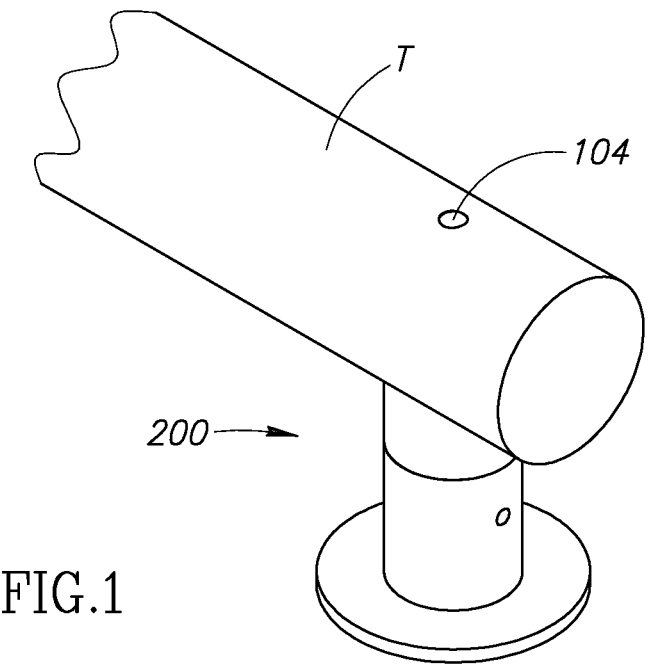
FIG. 1 is a perspective view of the first preferred embodiment of the securing method and system of the present invention.

With reference to the accompanying drawings, there is shown in FIG. 1 a first preferred embodiment of a method and system of securing a cross member 200 to a tube T. Two holes, a first hole 102 and a second hole 104, are drilled in opposite surfaces of the length of the tube T. The first hole 102 is larger than the second hole 104. The cross member 200 further includes an upper body 210 and a lower body 220. In the first preferred embodiment of the present invention, all of the elements are constructed of metal.

Figure 2:
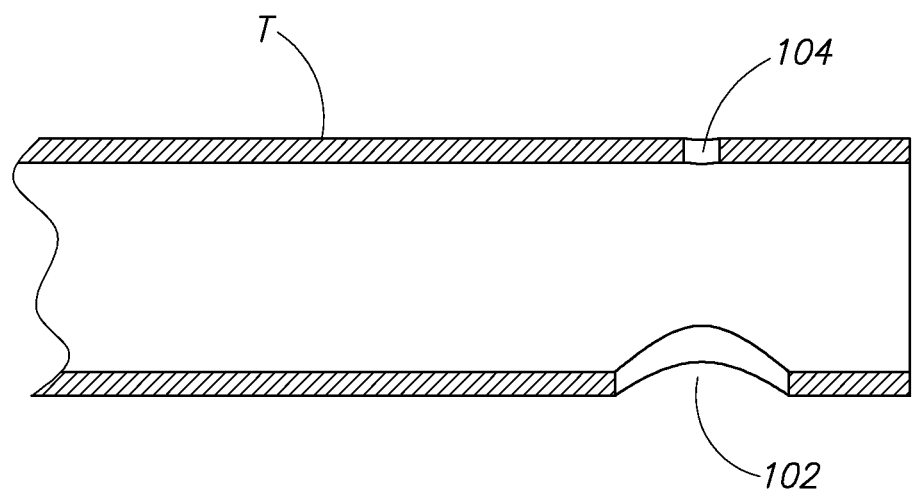
FIG. 2 is a cross-section view of a conventional tube having two holes consistent with the first preferred embodiment of the securing method and system of the present invention.

FIG. 2 shows a cross-section of the tube T with the first hole 102 and the second hole 104 drilled at opposite surfaces. In the preferred embodiment, the tube T is a cylindrical tube, preferably stainless steel, though the invention is applicable to tubes of varying shape. See e.g., FIG. 8. The holes are formed using known drilling or punching techniques.

Figure 3:
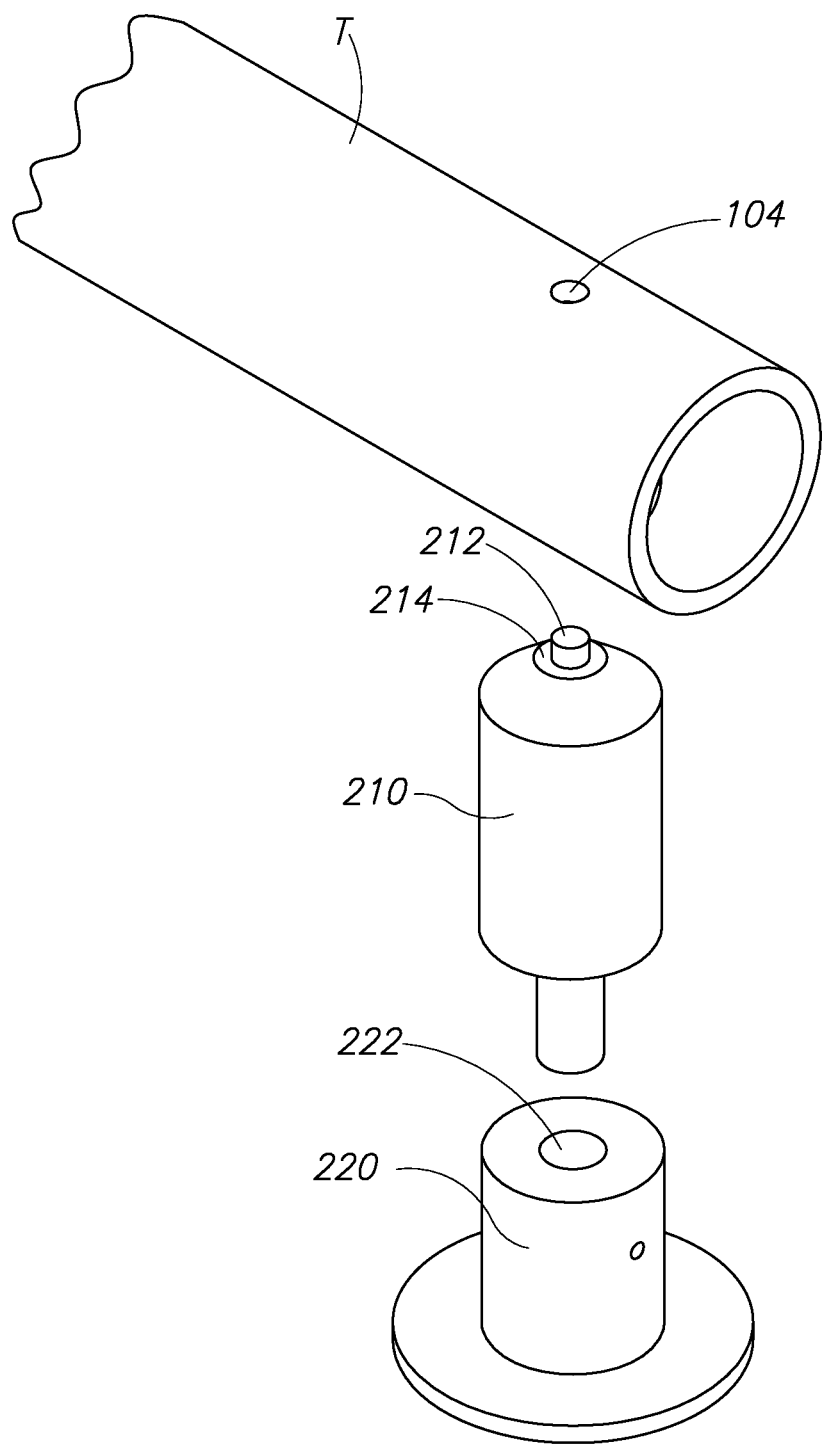
FIG. 3 is an exploded view of the first preferred embodiment of the securing method and system of the present invention.

As illustrated in FIG. 3, the preferred embodiment of the complete system/method includes the assembly of three major elements, the tube T, the upper body 210 and the lower body 220. The upper body 210 includes a head 212 which is inserted through the first hole 102 and into the second hole 104 during assembly. The upper body 210 preferably includes a stopping surface 214. The head 212 is sized and adapted to fit into the second hole 104 and the body 210 is sized and adapted to fit into the first hole 102.

Figure 4:
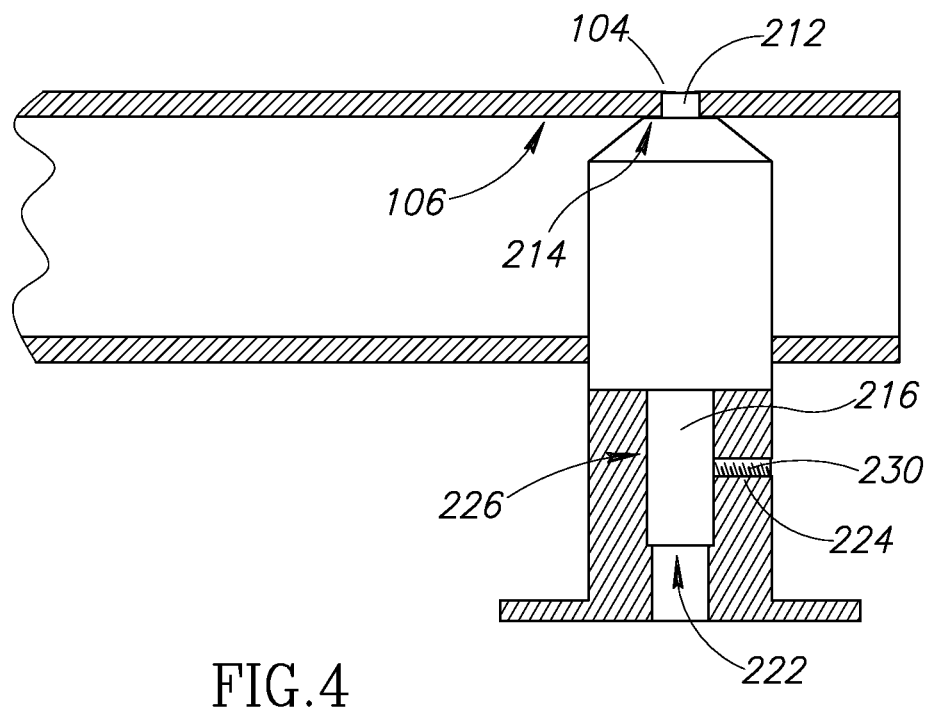
FIG. 4 is a cross-section view of the first preferred embodiment of the securing method and system of the present invention taken along lines 4-4 of FIG. 1.
Figure 5:
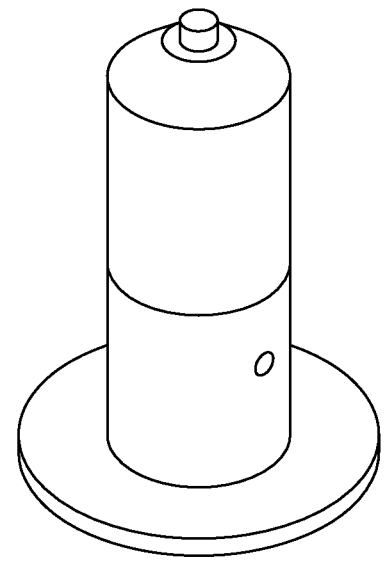
FIG. 5 is a perspective view of the upper body and lower body of the first preferred embodiment of the securing method and system of the present invention.

The assembled system is shown by the cross-section view of FIG. 4. As shown in FIG. 4, the head 212 is positioned in the second hole 104 and the stopping surface 214 contacts the inner wall of the tube 106. The upper body 210 is preferably designed to have a cylindrical form and is positioned in the first hole 102 of the tube T. The Upper body 210 should fit tightly in the first hole 102. The lower body 220, which selectively connects to the upper body 210, extends away from the tube T.

The upper body 210 is preferably fixed to the tube T by welding the head 212 to the tube T at the second hole 104. Once welded in place, the head 212 should fill the second hole 104 to create a junction point in the tube T. In the preferred method, the exterior of the tube T at the junction is polished to remove all visible traces of the second hole 104 having existed. In the preferred embodiment, the cross member 200 need not be welded or otherwise fixed to the first hole 102.

The upper body 210 further includes a central projection 216 extending opposite from head 212 and outward from the tube T (when connected). The lower body 220 includes a receiving cavity 222 sized and shaped to receive the central projection 216. In the preferred embodiment, the central projection 216 and the receiving cavity 222 are both cylindrical, though other shapes may be used.

The lower body 220 further includes a screw 230 that connects the lower body 220 to the upper body 210. In the preferred embodiment, the screw 230 pass through screw threads 224 and selectively engages the central projection 216 to create an interference fit between the screw 230, the central projection 216, and an inner wall 226 of the receiving cavity 222. Accordingly, when the screw 230 is tightened, the lower body 220 is secured to the upper body 210, and when the screw 230 is loosened, the lower body 220 is released from the upper body 210.

Figure 6:
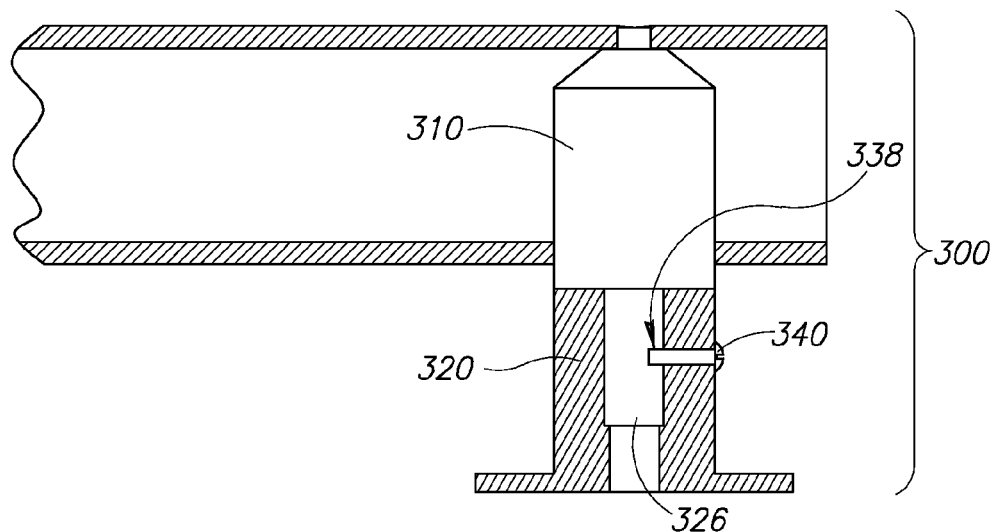
FIG. 6 is a cross-section view of a second preferred embodiment of the securing method and system of the present invention.

In a second preferred embodiment, illustrated in FIG. 6, the central projection 326 includes a central projection screw hole 338 and the screw 340 engages the upper body screw hole 338 to connect the upper body 310 and the lower body 320. A tight fitting pin (not shown) may be used in place of the screw 340.

Figure 7:
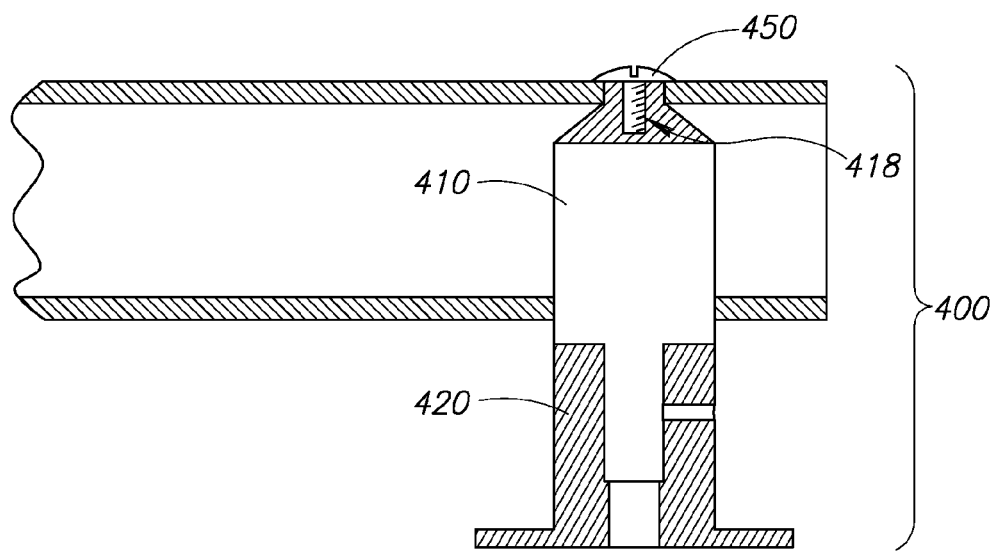
FIG. 7 is a cross-section view of a third preferred embodiment of the securing method and system of the present invention.

In a third preferred embodiment, illustrated in FIG. 7, the elements of the system are constructed of plastic or fiberglass. In the third preferred embodiment, the upper body 410 further includes a bolt cavity 418 for receiving a bolt 450. The bolt 450 includes a bolt head 452 that has a surface extending beyond second hole 104, thereby securing the upper body 410 to tube T, when the bolt 450 is tightened in place. Accordingly, the attachment of bolt 450 to upper body 410 secures upper body 410 to tube T.

Figure 8:
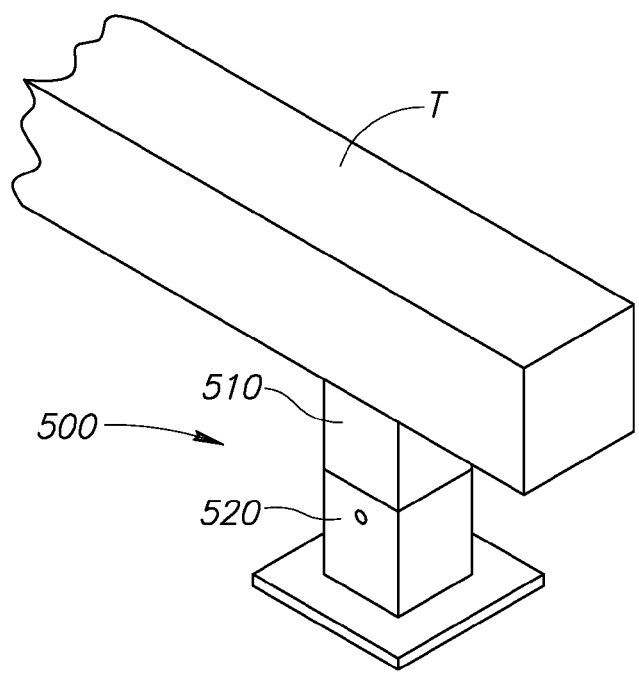
FIG. 8 is a perspective view of a fourth preferred embodiment of the securing method and system of the present invention.

FIG. 8 illustrates a fourth preferred embodiment of the present invention in which the tube T is non-cylindrical. The fourth preferred embodiment includes a cross member 500, an upper body 510 and a lower body 520.

Figure 9:
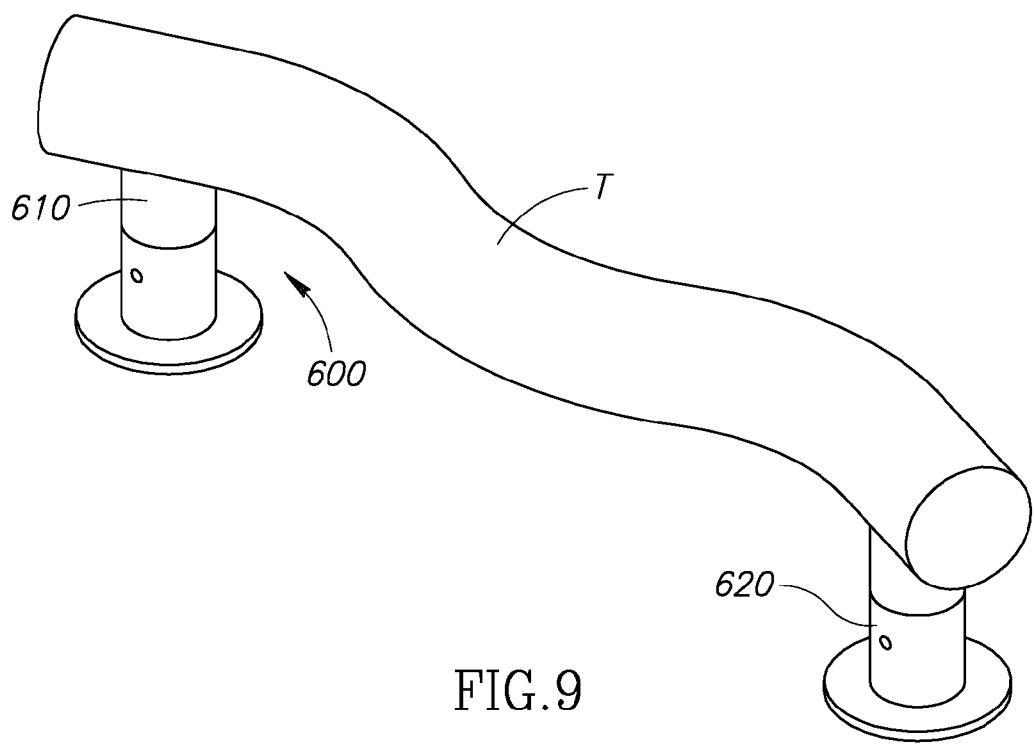
FIG. 9 is a perspective view of a fifth preferred embodiment of the securing method and system of the present invention.

FIG. 9 illustrates a fifth preferred embodiment of the present invention in which the tube T has a wave shaped. The fifth preferred embodiment includes a cross member 600, an upper body 610 and a lower body 620.

Figure 10:
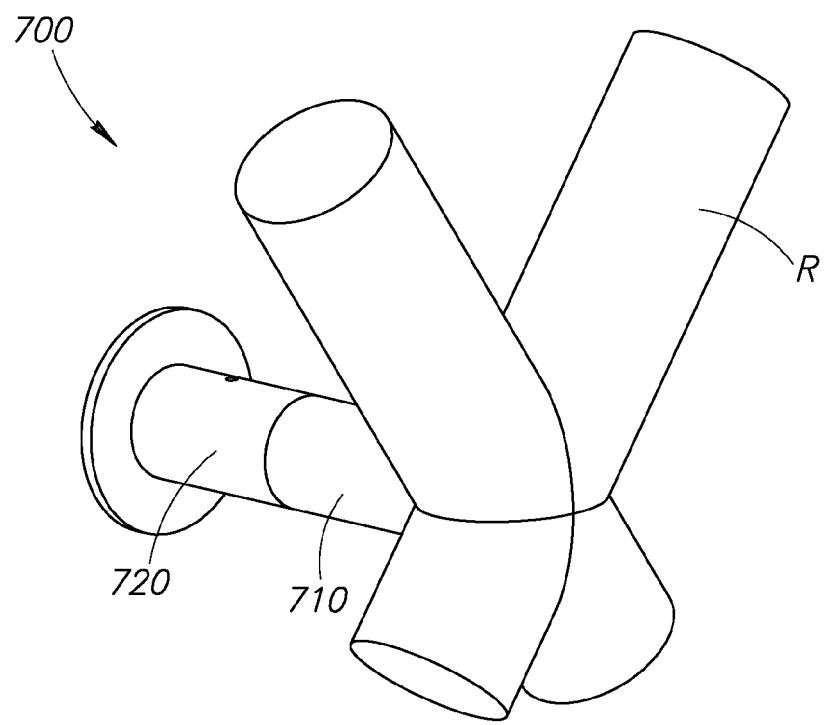
FIG. 10 is a perspective view of a sixth preferred embodiment of the securing method and system of the present invention.

FIG. 10 illustrates a sixth preferred embodiment of the present invention in which a cross member 700 attaches to a robe hook R. The cross member 700 includes an upper body 710 and a lower body 720.

Figure 11:
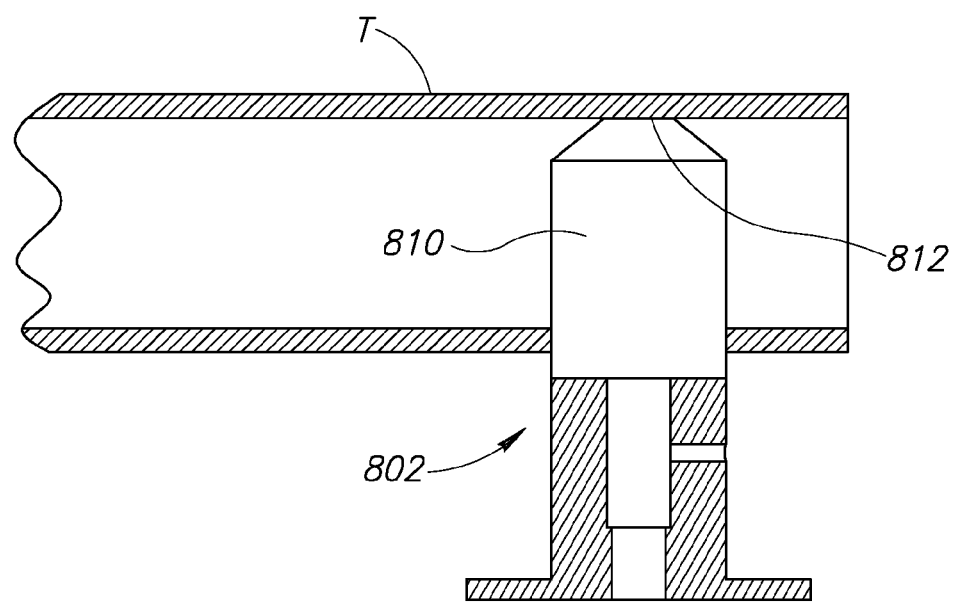
FIG. 11 is a cross section view of a seventh preferred embodiment of the securing method and system of the present invention.

FIG. 11 illustrates a seventh preferred embodiment of the present invention in which tube T includes only a first hole 802 and upper body 810 is secured directly to tube T at head 812. The head 812 may be welded or otherwise affixed to tube T by running an electric current through tube T and head 812.

The above described system allows a user to affix the lower body 220, 320, 420, 520, 620 alone to a wall (not shown) and then affixing the upper body 210, 310, 410, 510, 610 to the tube T. The lower body 220, 320, 420, 520, 620 and the upper body 210, 310, 410, 510, 610 can then easily connect to each other, completing installation of the system.

The system/method of the present invention provides increased strength against sheer and rotational forces acting on the connection of the tube T and the cross member 200, 300, 400, 500, 600. In contrast to conventional single surface systems/methods, the present invention is less prone to deformity and is capable of supporting increased weight.

The accompanying drawings only illustrate several embodiments of a system and method for securing a cross member to a tube and their respective constituent parts, however, other types and styles are possible, and the drawings are not intended to be limiting in that regard. Thus, although the description above and accompanying drawings contains much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. A system of attaching a coupling member to a tube, comprising:
   a hollow tube comprising a sidewall having an outer surface, an inner surface and axially aligned concentric openings including a first opening and a second opening that is smaller than the first opening extending through diametrically opposing sides of the sidewall; and
   a coupling member comprising:
     an upper coupling element comprising a cylindrical body sized and shaped to matingly correspond to the first opening that includes an first end having a first surface and a second end having a second surface, a cylindrical head extending from the first end and a projection that is axially aligned with the head extending from the second end, the head being sized and shaped to matingly correspond to the second opening; and
     a lower coupling element comprising a cylindrical body sized and shaped to correspond to the cylindrical body of the upper coupling element, the cylindrical body of the lower coupling element including a first end having a first surface, a second end having a mounting flange affixable to a wall, and a longitudinally extending receiving cavity,
   wherein the head extends through the first opening in the tube and is fixed at the second opening such that the first surface of the upper coupling element abuts the inner surface of the tube and the cylindrical body of the upper coupling element is adapted to fit within the first opening of the tube, and
   wherein the projection extends into the receiving cavity of the lower coupling element such that the second surface of the upper coupling element and the first surface of the lower coupling element abut each other and are fastened to each other.

2. The system of claim 1, wherein the head is welded to the tube, forming a junction area.

3. The system of claim 1, wherein the tube is made of stainless steel.

4. The system of claim 1, wherein the upper coupling element is comprised of a solid material.

5. The system of claim 1, wherein the lower coupling element includes an opening extending through a sidewall thereof, transverse to and adjoining the receiving cavity of the lower coupling element.

6. The system of claim 5, further comprising a fastener extending through the opening in the sidewall of the lower coupling element to selectively engage the projection and to create an interference fit between the fastener, the projection of the upper coupling element and the receiving cavity of the lower coupling element.

7. A method of attaching a coupling member to a tube, comprising the steps of:
   providing a hollow tube comprising a sidewall having an outer surface, an inner surface and axially aligned concentric openings including a first opening and a second opening that is smaller than the first opening extending through diametrically opposing sides of the sidewall; and
   providing a coupling member comprising:
   an upper coupling element comprising a cylindrical body sized and shaped to matingly correspond to the first opening that includes a first end having a first surface and a second end having a second surface, a cylindrical head extending from the first end and a projection that is axially aligned with the head extending from the second end, the head being sized and shaped to matingly correspond to the second opening; and
   a lower coupling element comprising a cylindrical body sized and shaped to correspond to the cylindrical body of the upper coupling element, the cylindrical body of the lower coupling element including a first end having a first surface, a second end having a mounting flange affixable to a wall, and a longitudinally extending receiving cavity;
   positioning the head into the first opening in the tube and affixing the head at the second opening such that the first surface of the upper coupling element abuts the inner surface of the tube and the cylindrical body of the upper coupling element is adapted to fit within the first opening of the tube; and
   inserting the projection into the receiving cavity of the lower coupling element such that the second surface of the upper coupling element and the first surface of the lower coupling element abut each other.

8. The method of claim 7, further comprising the step of affixing the head to the tube by welding.

9. The method of claim 8, further comprising the step of polishing an area that is welded to remove all visible traces of the second opening.

10. The method of claim 7, wherein the tube and the coupling member are constructed of plastic or fiberglass.

11. The method of claim 7, wherein the head of the upper coupling element includes a bolt cavity for receiving a bolt.

12. The method of claim 11, wherein the bolt includes a bolt head with a surface extending beyond the second hole, thereby securing the upper coupling element to the tube, when the bolt is fastened in place.

13. The method of claim 7, wherein the lower coupling element includes an opening extending through a sidewall thereof, transverse to and adjoining the receiving cavity of the lower coupling element and the method further comprises the step of extending a fastener through the opening in the sidewall of the lower coupling element and selectively engaging the projection so as to create an interference fit between the fastener, the projection of the upper coupling element and the receiving cavity of the lower coupling element.

\* \* \* \* \*